United States Patent [19]

Williams

[11] Patent Number: 4,735,038

[45] Date of Patent: Apr. 5, 1988

[54] LAWN MOWER STABILIZING DEVICES FOR USE IN MOWING STEEP TERRAIN

[76] Inventor: Will T. Williams, 6 Boundbrook Dr., Paris, Tenn. 38242

[21] Appl. No.: 795,444

[22] Filed: Nov. 6, 1985

Related U.S. Application Data

[63] Continuation-in-part of Ser. No. 651,021, Sep. 17, 1984, Pat. No. 4,589,252.

[51] Int. Cl.⁴ .................. A01D 75/28; B60B 15/00
[52] U.S. Cl. ..................... 56/255; 56/16.7; 301/44 R
[58] Field of Search ........ 56/16.4, 255, 256, DIG. 10; 301/43, 44 R, 44 T, 45, 46, 47, 50; 24/277, 278, 279

[56] References Cited

U.S. PATENT DOCUMENTS

| | | | |
|---|---|---|---|
| 590,734 | 9/1897 | Cross | 301/41 R |
| 870,548 | 11/1907 | Dentzeau | 301/44 T |
| 1,419,350 | 6/1922 | Beers | 301/39 T |
| 2,474,939 | 7/1949 | Halford | 301/47 |
| 2,598,851 | 6/1952 | Spevak | 301/43 |
| 2,621,383 | 12/1952 | Tresidder et al. | 24/278 |
| 3,021,179 | 2/1962 | Lindner et al. | 301/47 |
| 3,199,815 | 10/1965 | Martinkovic et al. | 24/277 |
| 4,589,252 | 5/1986 | Williams | 56/255 |

Primary Examiner—Stephen J. Novosad
Assistant Examiner—William P. Neuder
Attorney, Agent, or Firm—Pravel, Gambrell, Hewitt, Kimball and Krieger

[57] ABSTRACT

Ground and/or turf penetrating discs for selective attachment to wheels of a lawn mower to increase safe operation of such lawn mowers on embankments. The ground engaging discs, are for selective secured engagement over the hub and tread of one or more of the lawn mower's wheels and include a plurality of outwardly extending projections which penetrate through the underlying grass, if any, and into the sod or earth's surface sufficiently during operation of the lawn mower to prevent its lateral slippage as it traverses a sloped surface. The projections extend completely around the disc and, when used, at least two are extending into the sod or ground or both at all times. The disc has notches for three adjustable holding brackets spaced about equal degrees (120°) around the disc for different size tires. The brackets are removable and secured firmly to the sides and tread of the tires by lock washers and knurled faces. Once adjusted for a tire size, only one bracket need be loosened to install or remove a device from a tire.

7 Claims, 2 Drawing Sheets

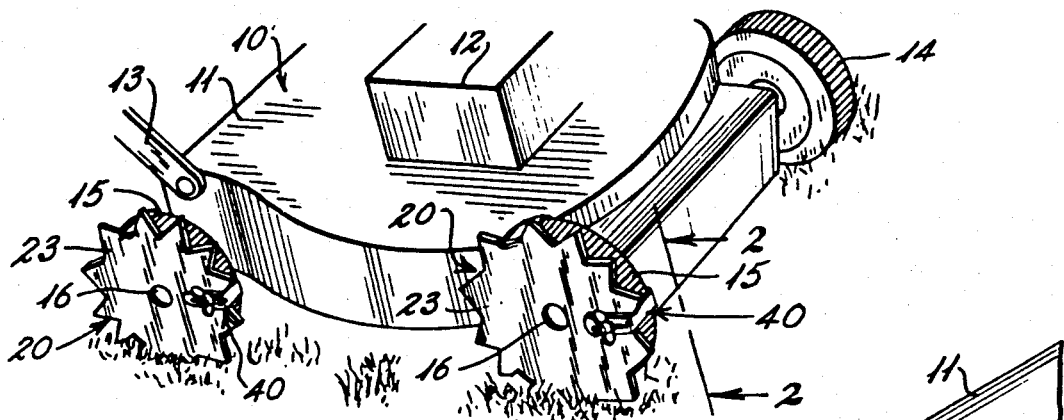
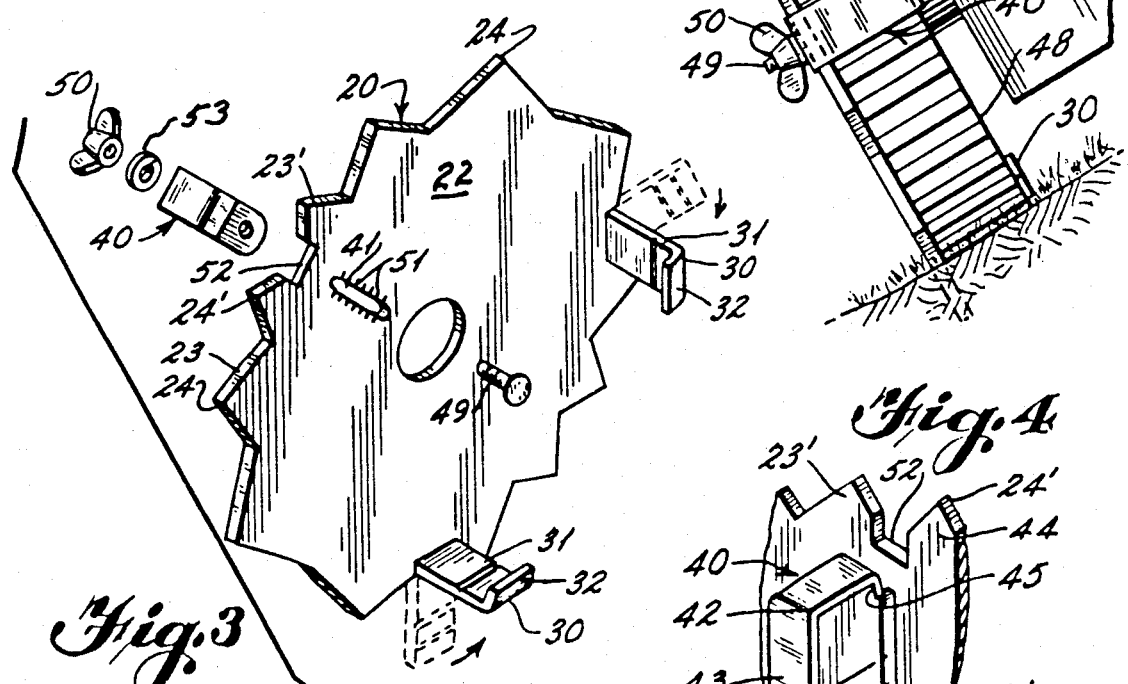
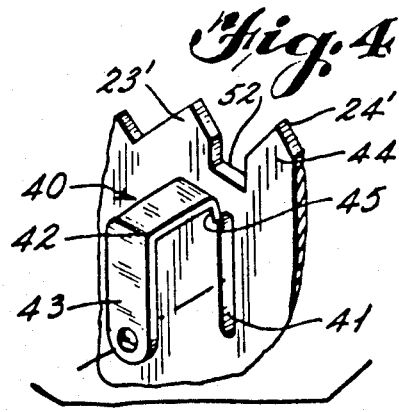

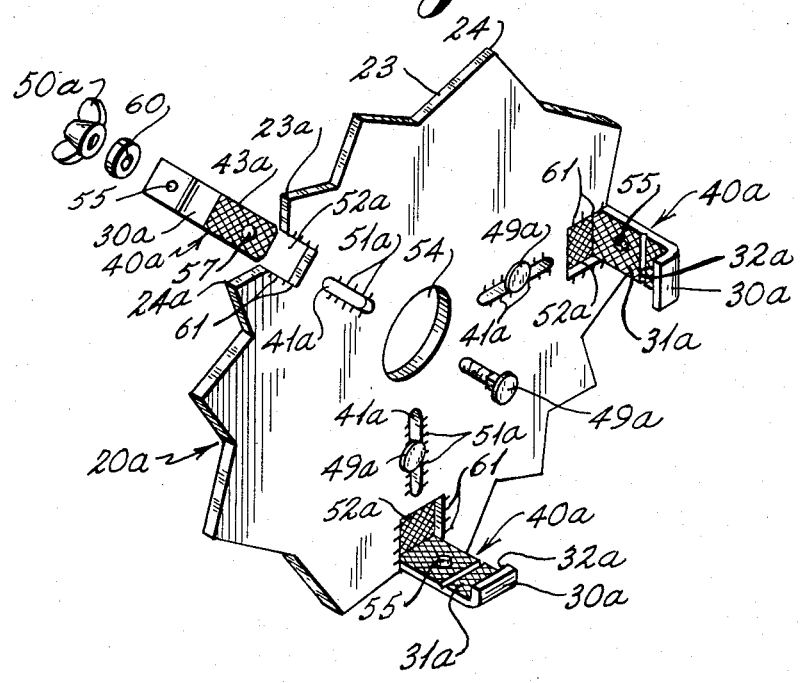
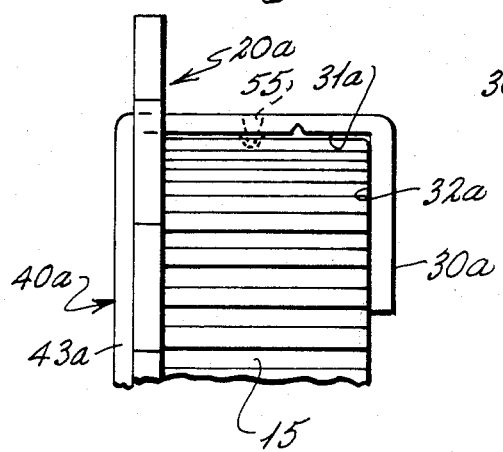

LAWN MOWER STABILIZING DEVICES FOR USE IN MOWING STEEP TERRAIN

This is a continuation-in-part application of my application Ser. No. 651,021 which issued as U.S. Pat. No. 4,589,252, May 20, 1986.

BACKGROUND OF THE INVENTION

Field of the Invention

This application is generally directed to safety devices for use in preventing lawn mower accidents and is particularly directed to a safety device for preventing lawn mowers from skidding while traversing a sloped embankment by providing ground and/or turf penetrating discs which are selectively engageable with at least the downhill wheels of a lawn mowing vehicle and readily attachable to such wheels when the lawn mowing vehicle is to be used over sloped terrain where the vehicle is operated laterally across the surface of the terrain.

History of the Prior Art

Heretofore there have been many developments which have been proposed with respect to increasing the safe use of lawn mowing vehicles. Every year there are a great many accidents which cause severe bodily injury to people using lawn mowers on terrain where the footing of the operator is not stable and/or where the center of gravity of the lawn mowing vehicle is such as to induce the vehicle to skid, slide, roll, or pitch to an extent that the operator may lose his balance resulting in loss of control of the vehicle.

The hazards associated with mowing embankments especially of steep grade are known by home owners as well as professional mowing services. Even with large tractor type vehicles, the possibility of the vehicle skidding as it traverses the slope from side to side is very real. Numerous innovations have been proposed with respect to determining the maximum safe angle of operation for selfpowered vehicles. For example, safety devices have been proposed to provide an audible or visual warning to an operator of a vehicle when they have exceeded the safe operating incline for the vehicle. But such innovations are not installed on most lawn mowing equipment available on the market today and therefore the average lawn mower operator has no electrical or mechanical warning that he is operating under conditions which may be unsafe.

To increase traction of lawn mowing vehicles along sloped surfaces, various rear drive train mechanisms have been proposed as well as enlarged rear wheel tread designs developed in an effort to prevent accidental rolling of a lawn mowing vehicle. In some instances, use has been made of outrigger type supports for preventing a lawn mowing vehicle from tilting or rolling as the mower is operated across a sloped embankment. Again, however, such outrigger devices are not readily available to most operators of lawn mowers and the expense of providing same prohibits their use in most commercial markets.

An additional problem which is inherent in the use of lawn mowing devices is the that the operator may easily slip on even a relatively slight incline due to ground moisture or dew conditions. The number of accidents attributable to the use of lawn mowing devices has resulted in considerable development of safety clutches and brakes for lawn mowers. Many such lawn mowers, however, rely on the operator during assembly of the lawn mower properly to install the saftey clutch or brake and frequently such safety devices are bypassed or break down during use so that they fail to operate as they should when the potential conditions for an accident exist. In addition, many propsed lawn mower safety devices will not prevent some types of injury to an operator especially if a larger vehicle rolls and spills the operator and perhaps pins him under the vehicle.

Because of the difficulty of mowing grass on steep inclines, such grass may not be cut and if cut, the time and effort required are much greater than for comparable areas of level or approximately level terrain.

SUMMARY OF THE INVENTION

This invention is directed to safety devices for use with lawn mowing vehicles and particularly is directed to ground and/or sod penetrating discs which are selectively mounted to one or more wheels of a lawn mowing vehicle and which include outwardly extending ground and/or sod penetrative points which penetrate the underlying sod and/or the earth's surface as the wheels of the lawn mowing vehicle rotate over the ground or grass in mowing operations. The ground engaging discs include a plurality of generally equally spaced projections or pointed teeth portions which extend outwardly beyond the tread surface of the wheel by equal or about equal distances and are configured so that such teeth are received into the sod and/or urged into the earth's surface as the lawn mowing vehicle wheel is rotated. The ground penetrating discs are easily and readily mountable over any lawn mower wheel by having either a pair of bendable but fixed flange portions which may be urged over the tread portion of the vehicle wheel and into engagement with the opposite side thereof or two rigidly secured brackets in lieu thereof, together with at least one selectively adjustably locking bracket which is also extendible over the tread portion of the wheel, but which is adjustable so as to be clamped tight against the vehicle wheel thereby to retain the disc firmly in position on the wheel of the lawn mowing vehicle.

It is a primary object of this invention to provide a relatively inexpensive solution to meet a longstanding need for preventing accidental skidding and slipping of lawn mowing vehicles during their use on inclined surfaces and, at the same time to permit the mowing of sloped terrain which previously could only be mowed with considerable difficulty and expenditure of time.

It is another object of this invention to provide sod and/or ground penetrative discs which may be selectively and quickly mounted directly to one or more of the wheels of a lawn mowing machine and which include a plurality of outwardly extending penetrating points which penetrate the sod and/or the earth's surface during the rotation of the wheels sufficiently to prevent any lateral slippage of the lawn mower as it traverses terrain which is either sloped, banked or otherwise graded on a vertical incline.

It is yet another object of the invention to provide a relatively inexpensive device for attachment to the wheels of a conventional lawn mowing device that can be stamped from metallic material or may be molded from various plastic materials, which includes outwardly extending ground penetrating points which extend beyond the periphery of the vehicle wheels so as to penetrate the underlying sod and/or earth's surface during rotation of the wheels, and which is secured into position by integrally formed tab members or strongly secured brackets which engage the wheels and which cooperate with a manually adjustable locking bracket to ensure that the attachment does not slip during operation of the vehicle.

It is a further object of the invention to provide a safety device for use with lawn mowers which ensures that the lawn mowing vehicle is stablized while traversing sloped surfaces and thereby not only provides a means for preventing the lawn mower from accidentally skidding, slipping, rolling or tipping on itself but also provides an anchor to prevent an operator from being accidentally injured through a loss of footing on inclined terrain. It is, nevertheless strongly recommended that the operator should also wear proper footwear to prevent slipping as well as giving additional traction.

A yet further object of the invention is to provide an attachment which permits the mowing of steep inclines which previously either were not mowed or were mowed only with difficulty and at some hazard to the operator.

BRIEF DESCRIPTION OF THE DRAWINGS

The invention is illustrated in preferred embodiments in the accompanying drawings, in which:

FIG. 1 is a illustrative partial view showing two of the sod and/or ground penetrating safety discs of a first embodiment of the invention mounted to the downhill wheels of a conventional push mower having a horizontal rotary blade;

FIG. 2 is an enlarged partial view taken along lines 2—2 of FIG. 1 showing one ground penetrating safety disc mounted on the front wheel of a conventional lawn mowing device;

FIG. 3 is a perspective assembly view of a ground penetrating disc of the present invention showing the locking tabs as they are initially formed extending radially outwardly with respect to the disc (in dotted lines) and as they are bent to engage a wheel of a conventional lawn mower wheel (in full lines);

FIG. 4 is an enlarged perspective partial view showing one form of manual locking device associated with the ground penetrating discs of the present invention;

FIG. 5 is a perspective view of a second embodiment of the invention similar to FIG. 3, having three adjustable locking brackets;

FIG. 6 is a partial front elevational view illustrating the locking bracket of FIG. 5 secured to the tire of a lawn mower wheel; and FIG. 7 is an enlarged perspective view showing the underside of the bracket illustrated in FIGS. 5 and 6.

DESCRIPTION OF THE PREFERRED EMBODIMENTS

With continued reference to the drawings, a conventional lawn mower 10 having a horizontal rotary blade is shown in FIG. 1 as including a deck portion 11 which covers and surrounds the horizontal rotary cutting blade (not shown), a motor housing 12 and handle means 13. In the illustrative view of FIG. 1, lawn mower 10 is shown as traversing a sloped surface in which the uphill wheels 14 are elevated with respect to the downhill wheels 15. Wheels 14 and 15 are normally connected to housing 11 by wheel mounting bolts 16 so such bolts may be removed to adjust selectively the vertical orientation of the vehicle wheels with respect to housing 11 thereby to select the proper cutting height of the lawn mower blade.

The lawn mower's sod and/or ground engaging safety discs 20 are shown in FIG. 1 as being attached to the downhill wheels 15 of a conventional push mower. It should be noted that discs 20 of the present invention may also be used with powered riding mowers as well as with larger vehicles such as used by state agencies for mowing grassy areas of highways and which may include tractors of the type having large drive wheels which may be in excess of three to five feet in diameter. When the ground penetrating discs are manufactured for use with heavier vehicles, it will be necessary to use stronger metallic materials than would otherwise be necessary for use with conventional push or riding mowers such as shown in FIG. 1.

As previously discussed, with the use of relatively small three and three and one-half horse power conventional lawn mowers, the ground penetrating disc may be formed of a sheet metal material (such as one-eighth inch thick aluminum) or may be formed of a plastic material having sufficient stiffness and strength to permit the disc to be used to support the weight of the lawn mower on an inclined surface and for the teeth to penetrate the underlying turf and/or ground without bending. It should also be noted that the ground penetrative safety discs of the present invention may be utilized both with conventional molded plastic wheels as well as pneumatic tires or solid rubber tires found on larger lawn mowing vehicles or tractors.

With particular reference to FIGS. 3 and 4, ground penetrative discs of the present invention include a generally planar body portion 22 which is defined by a main body portion and an outer continuous periphery having a diameter which is generally equal to the diameter of the lawn mower wheel to which the discs will be secured. Each disc has a plurality of outwardly extending ground penetrative teeth 23 integrally formed therewith which extend outwardly beyond the main body portion 22. As shown in the drawings, the ground penetrative teeth are generally equally spaced around the periphery of the discs and the points 24 thereof are for the most part generally radially aligned with the central axis of the discs. Preferably, penetrating points 24 of the teeth as well as the configuration of teeth 23 are symmetrically and equally spaced around the periphery of the discs so that there is equal resistance to movement during rotation of the disc through a continuous revolution of the vehicle wheel to which the disc is attached. In addition, teeth 23 are spaced so that the penetrative points 24 provide a continuous penetrating contact with the earth's surface and/or underlying sod during the rotation of lawn mowing vehicle wheel and therefore at least two of the teeth will be in engagement with the earth's surface and/or the underlying sod at all times during the rotation of each lawn mowing vehicles's wheel.

Although the symmetry of ground penetrating points 24 is of importance, there may be some deviation between the spacing of a point without adversely affecting the requisite sod and/or ground engagement capability of disc 20 during use. For instance, the ground penetrating safety discs of the preferred embodiments of the present invention are designed so that the operator of a lawn mowing vehicle may selectively attach such safety devices to the wheels without having to remove the wheels from the lawn mower. Therefore, it is necessary to provide means for attaching the lawn mower safety discs to the wheels by clamping means which engage the wheel along the outer periphery thereof as shown in FIG. 1 of the drawings. It is contemplated that the teeth be equally spaced around the total periphery of the ground penetrative discs with each disc being mounted centrally over the mounting bolt 16 of the vehicle's wheels and thereby provide uniform ground and turf penetrating capability at all times. In the preferred embodiments, however, it is realized that most mower vehicle operators are not likely to remove the vehicle's wheels to mount the safety discs, particularly if lawn mowing on an inclined surface accounts for only a minor portion of the lawn which is being mowed.

In the preferred embodiments, the ground penetrating discs are selectively attachable over the surface of the ground engaging wheels, such as shown at 15, by means of at least two brackets or clips 30 which are generally U-shaped and in the first embodiment extend outwardly from the periphery of the main body portion of the ground engagement discs at points which are spaced approximately one-third of the distance around the circumference of the disc. Each bracket or clip 30 includes a tire tread traversing or engaging portion 31 and an inner tire surface engaging portion 32. As previously discussed, the discs may be stamped from a sheet metal material with the clip portions integrally formed therewith. The clips may thereafter be formed by bending the outwardly extending tabs shown in FIG. 3 in doted lines to form the generally U-shaped configuration shown in the drawings in full lines.

In addition to the two spaced stationary clips 30, a selectively adjustable locking bracket or clamp 40 is mounted to the ground penetrating discs through an elongated slot 41. The elongated slot extends inwardly from adjacent the periphery of the main body portion toward the central axis of the ground engaging discs. Further, the slot is located such that the locking bracket will be positioned at a point generally between the mounting tab portions 30 so as to be equally spaced with respect thereto about the periphery of the discs.

Adjustable mounting clamp 40 includes a generally U-shaped mounting member 42 having a first leg portion 43 which extends along an outer face 44 of the disc as shown in FIG. 4. A generally parallel leg member 45 is spaced from leg portion 43 and extends along the inner side 48 of wheel 15. The first leg portion 43 is selectively united with disc 20 by use of fasteners such as a bolt 49 and wing nut 50 with an intervening lock washer 53. The locking engagement between adjustable mounting clamp 40 and disc 20 is ensured by providing a series of locking serrations 51 which are formed along the length of slot 41. As the orientation of elongated slot 41 is generally radial with respect to the central axis of disc 20, adjustable mounting clamp 40 may be slidingly adjustable radially inwardly and outwardly with respect to the central axis thereof. In this manner, the adjustable mounting clamp may be selectively positioned so as to be in abutting contact with the tread portion of a lawn mower wheel to which disc 20 is attached after which the time the fastening means (41, 49, 50, 53) is tightened to lock clamp 40 in engagement with disc 20.

To permit adjustable mounting clamp 40 to be properly seated wtih the outer periphery of the main body portion as well as to permit the clamp to be more radially adjustable with respect to slot 41, a notch 52 is provided in the area which might normally be occupied by a root of teeth 23 or by one of such teeth with the central portion of notch 52 being axially aligned with elongated slot 41 and central axis of the ground engaging disc. Notch 52 is formed to be of a width to receive cooperatively and slidably, but without play, adjustable mounting clamp 40 therein as shown in FIG. 3. As notch 52 is formed in the area which is otherwise occupied by a tooth 23, teeth 23' which are formed on either side thereof are somewhat smaller than teeth 23 which are otherwise formed along the outer portion of the ground engaging disc. But each smaller ground engaging tooth 23' has an outwardly extending point or tip 24' which is generally spaced outwardly of the inner periphery of disc 20 a distance equal to that of points 24 of teeth 23.

In the use of disc 20 of the present invention, a disc having a main body portion of a diameter substantially equal to that of the lawn mower wheels to which the disc will be attached is selected for mounting to the lawn mower wheels. After mounting bracket 30 has been bent to the generally U-shaped configuration shown in FIG. 3, the selected wheel 15 of lawn mower 10 is elevated slightly and thereafter disc 20 is positioned adjacent thereto so that the wheel's tread is received within the U-shaped stationary mounting brackets 30. The adjustable mounting clamp which is freely slidable along the elongated opening 41 is therafter forced radially inwardly towards the center of disc 20 so that the U-shaped mounting bracket 42 thereof is brought into tightly abutting engagement with the tread of lawn mower wheel 15. The fastening means is thereafter secured firmly to lock adjustable mounting clamp 40 in position.

During operation of the lawn mower, as the wheels 15 are rotated, teeth 23 and 23' of discs 20 penetrate the underlying sod and/or the earth's surface sufficiently to prevent the lawn mower from any lateral skidding relative to the ground as the lawn mower is moved across the slope. It is generally preferred that discs 20 be mounted to at least two wheels of the lawn mower and on the same side thereof. As shown in the drawings, the ground engaging discs are mounted to the downhill side or downhill wheels of the lawn mower. If desired, the discs 20 can be mounted on the opposite sides of the mower one forward and the other to the rear. However, it is preferred that the downhill side be utilized as the mower's weight is distributed toward the downhill wheels. Also, discs 20 can be on all wheels of mower 10.

Most common wheel sizes for push-type mowres are six to eight inches in diameter. In this respect the ground engaging discs should have an inner main body diameter of six to eight inches with the teeth extending approximately one inch outwardly therefrom. As previously mentioned, however, discs 20 of the present invention may be manufactured for use with larger lawn mowing vehicles having wheel diameters in excess of one foot or more. In addition to the diameter of discs 20 being increased, the size of the brackets 30 and of the adjustable mounting bracket must also be proportionally varied to compensate for the width of the lawn mowing vehicle's tire to which discs 20 are attached.

The above described device has worked well in practice and has permitted the mowing of steep inclines which were either previously not mowed or mowed only with difficulty such as by two men, one manipulating the mower and the other using a rope to overcome the effects of gravity or by the slow process of using "Weed Eaters". Moreover, after substantial use of the invention, apprehension that the adjustable mounting clamp 40 might work itself loose, particularly in view of the vibrations imparted from the mowing operation, has proved groundless. For this reason and in view of certain unforeseen problems which have come to light from practical experience with the invention, the invention has been modified as disclosed in FIGS. 5-7 to include three adjustable mounting clamps designated generally by 40a which are receivable in a notch 52a in a close but slidable fit disposed between teeth 23a and 24a, notch 52a projecting towards the center of circular opening 54 which is adjacent mounting bolt 16 of wheels 15. Disposed between each notch 52a and the central circular opening 54 are three radially extending slots 41a which are surrounded by a series of locking serrations or knurling 51a in both opposing sides of disc 20a. Each slot 41a is adapted to receive slidably but snuggly, a stove bolt 49a which has a square cross section where it extends through slot 41a.

Preferably the interior portion of clamp 40a which grips the periphery of wheel 15 has punched therein to protrude downwardly about ⅛ to ¼ inch, a protrusion 55 with relative sharp jagged edges for ensuring that in operation there is a tight frictional grip between clamp 40a and the periphery of wheel 15 and that disc 20a is at all times held tightly flush against the side of wheel 15. Alternately or in conjunction with protrusion 55, the inwardly facing side of each clamp 40a may be knurled, including not only that portion which bears against the periphery of wheel 15 but also its inward face of leg portion 43a and the inner tire surface engaging portion 32a of the inboard bent portion 30a.

Each stove bolt 49a is received, again snuggly but slidably, by an opening 57 in leg 43a of clamps 40a. Over the threaded portion of stove bolt 49a is placed a lock washer 60 and a wing nut 50a is threadably received upon the threads of stove bolt 49a and firmly tightened to secure clamp 40a in the desired position on disc 20a, the outboard side of leg portion 43a engaging the face of disc 20a including the knurled area around slot 41a. This position is determined by the size of wheel 15 so that circular opening 54 is perfectly centered over mounting bolt 16 of wheel 15. However, once this adjustment has been made for all three clamps 40a and each clamp is firmly secured to disc 20a, it is subsequently necessary only to loosen one clamp 40a to remove the entire attachment. To assist in centering disc 20a so that its circular opening 54 is centered over bolt 16, evenly spaced and numbered, if desired, measurement indentations 61 may be placed along the edge of each slot 52a. Although once each of the brackets 40a has been appropriately located for a given wheel 15 and it is therefore only necessary to loosen one such bracket to remove the entire disc 20a, with wear and tear of the periphery of wheel 15 over a period of time, further adjustment of all three brackets 40a may be required to ensure that disc 20a is properly centered on wheel 15.

A disc 20a for 6½" to 7½" wheels is constructed from ⅛" aluminum sheet and has twelve equally spaced apart teeth. The radii to the root of each tooth is 3½" and the point of each tooth measures 4½" from the center of disc. Clamps 40a are received in one inch wide slots which extend inward relative to the root diameter ⅛" and are disposed between two teeth, there being four teeth between each slot. At the point of each tooth, its sides define an acute angle of about 75° (actually 77°). Depending upon the size of the device and use to which it is to be put, the number of teeth may vary from, for most lawn mowers, nine to eighteen and is preferably a multiple of three. Each tooth may extend outwardly about ¾ to 1½ inches, and the angle of the point is preferably in the range of 60° to 90°.

The disc 20a has a number of advantages. It is easier to manufacture because it does not incorporate two integral brackets which must be bent into the proper shape. Also a thicker gage or stiffer, more wear resistant alloy, or both, may be used, if desired, because bending of portions of disc 20a are not necessary. Having disc 20a flat in turn reduces substantially the size of shipping containers for each set of discs 20a (and also enclosed clamps 40a, bolts 49a, and nuts 50a with washers 60) from that required for the embodiment shown in FIGS. 1-4. If desired, several sets of clamps may be included for different widths of wheels 15.

Another advantage of this embodiment is that the three movable clamps permit significantly greater adjustability for different wheel sizes than the first described embodiment and, because the clamps 40a when properly secured to disc 20a do not slip once adjusted for a particular size wheel, the brackets of the instant embodiment are just as easy to place on and take off of the wheels as the first described device which is an important practical consideration.

With the mounting brackets or clamps 40a being made separately, stronger aluminium or other suitable material for same can be used for manufacturing them than would normally be considered when two of the clamps or brackets are integral with disc 20a.

By knurling the interior of each clamp 40a and providing protrusions 55 on the portion of each clamp 40a received by the periphery of wheel 15, each disc 20a is more firmly attachable to the corresponding wheel 15 and it is less likely, in fact almost impossible, that disc 20a will accidently become loose.

Discs 20a need not be reversed when placed on wheels on opposite sides of the mower and therefore, if desired, teeth 23 may be shaped so as to be both more readily penetrative into and easier to withdraw from the underlying sod and/or ground whereby the tooth edges need not have the same angle relative a tangent to a circle circumscribed by each point 24 which intersects point 24 for the tooth 23 involved. With the edges of teeth 23 conformed for optimal penetration and withdrawal as disc 20a turns to minimize energy lost due to such penetration, such edges are also not necessarily straight as depicted in the drawings, but may be curved.

The forgoing detailed descriptions of the embodiments of the invention have been provided for clearness of understanding only and no unneccessary limitations should be understood therefrom, for modifications will be obvious to those skilled in the art.

Having disclosed my invention, what I claim as new and to be secured by Letters Patent of the United States is:

1. A safety apparatus for use in the process of mowing grass to prevent lawn mowing vehicles from skidding laterally when traversing generally horizontally across steeply inclined terrain, comprising:
   a disc selectively and firmly mountable to the outboard sides of wheels of such vehicles, each said disc having a body proportion substantially within the diameter of said wheels with a plurality of teeth means formed as an integral part of said body portion extending outwardly therefrom and from the periphery of the wheel on which said disc may be mounted, said teeth means being so configured to penetrate the underlying sod and/or ground sufficiently to prevent lateral movement of the vehicle, said teeth means extending outwardly from and entirely around the periphery of the vehicle's wheels and being sufficiently close together to ensure that at least two said teeth means engage the underlying sod and/or ground at all times when in use; and clamping means for readily attaching and detaching said disc respectively to or from a selected wheel, said clamping means comprising at least three clamps, each said clamp including a wheel tread engaging portion having at least one protrusion extending therefrom to engage the tread of said wheel and to increase the grip of said clamp to said wheel, and said disc defines at least three notches for receiving said clamps, and means for adjustably securing said clamps to said disc so that said disc can be clamped to wheels having different diameters within about ½ inch of the root diameter of said disc.

2. Apparatus in accordance with claim 1, wherein each said clamp includes a leg portion which is secured to the body of said disc, the interior side of said leg portion and said body where it joins said leg portion both including roughened areas which resist relative movement between them when said leg portion is firmly secured against said body.

3. A lateral skid prevention device for attachment to the wheels of a lawn mower for mowing inclines which are relatively steep, comprising:

a disc, said disc including a body portion having a plurality of outwardly extending integrally formed teeth adapted to penetrate turf and bare areas of the ground with at least two of said teeth received in the ground at all times when in use, said teeth extending sufficiently outwardly from said body portion and from a lawn mower wheel on which it is to be mounted so as to penetrate the underlying turf or bare areas of ground and having sufficient side area viewed in side elevation to prevent any substantial lateral movement of such wheel;

clamping means for firmly attaching said disc to lawn mower wheels within a predetermined range of diameters, said clamping means comprising at least three clamps substantially equally spaced apart for tightly gripping the periphery of any selected lawn mower wheel having a diameter within set range of diameters so that said disc is firmly attached to said selected wheel, each said clamp comprising an outboard leg which is secured to said disc and a thread gripping portion extending generally normally inboard therefrom and an inboard bent portion which is generally parallel to and extends inwardly from said gripping portion in generally the same direction as said leg for bearing against the inboard side of the wheel on which said disk is mounted; and, securing and adjustment means for firmly but removably securing said leg at selected positions on said disc so that each said gripping portion is radially adjustable to an equal distance within limits from the center of said disc.

4. A device in accordance with claim 3 wherein said securing and adjustment means comprises an elongated and a further aligned opening in each said leg and said disc which permits said leg to be moved inwardly and outwardly within limits with respect to the center of said disc and fastening means received through said aligned openings for securing said leg at a suitable position relative to said disc and the wheel on which the disc is mounted.

5. A device in accordance with claim 4 comprising locking means associated with said fastening means for locking said leg on said disc at said selected position.

6. A device in accordance with claim 5, wherein said disk has at least nine teeth, the number of teeth preferably divisible by three, spaced equally around its periphery, each said clamp extending from said body portion of said disc between the points of two said teeth, there being an equal number of said points between adjacent said clamps.

7. A lateral skid prevention device in combination with a motor driven rotary blade lawn mower which includes a housing, a generally horizontal rotary blade in the housing, a motor mounted on the housing for rotating the blade and four ground engaging wheels mounted from the housing for supporting the mower, the lateral skid prevention device being mounted on at least one of the wheels, comprising:

a generally circular body having a plurality of teeth extending outwardly relative to the periphery of said body and the wheel and entirely around said periphery so that when the lawn mower is traversing sod at least two of said teeth are extending into the sod, said teeth having a sufficient lateral area that penetrates in to said sod to prevent substantial lateral movement by the mower when mowing grass on relatively steep inclines so that the ground engaging wheels on the uphill side of the mower are substantially higher than the ground engaging wheels on the downhill side of the mower; and a readily detachable clamping means, said clamping means comprising at least three clamps spaced equally around the periphery of said body and secured thereto by adjustable fastening means so that each of said clamps is movable within predetermined limits inwardly and outwardly relative to the wheel, for securing said body to the outboard side of the wheel;

wherein said fastening means includes locking means for locking each said clamp in a selected position, said locking means being readily removable so that each of said clamps is separately readily removable and said clamping means is detachable from the wheel upon loosening of any one of said clamps from said body.

* * * * *